No. 771,583. PATENTED OCT. 4, 1904.
J. J. H. SOUHEUR.
HEATING APPARATUS.
APPLICATION FILED APR. 29, 1903.
NO MODEL.

WITNESSES:
Fred White
Thomas Wallace

INVENTOR:
Jean Joseph Hubert Souheur,
By his Attorneys,
Arthur E. Fraser & Co

No. 771,583. Patented October 4, 1904.

UNITED STATES PATENT OFFICE.

JEAN JOSEPH HUBERT SOUHEUR, OF ANTWERP, BELGIUM.

HEATING APPARATUS.

SPECIFICATION forming part of Letters Patent No. 771,583, dated October 4, 1904.

Application filed April 29, 1903. Serial No. 154,809. (No model.)

*To all whom it may concern:*

Be it known that I, JEAN JOSEPH HUBERT SOUHEUR, of Canal St. Pierre 1, Antwerp, Belgium, manufacturer, have invented certain new and useful Improvements in or Relating to Heating Apparatus, of which the following is a specification.

My invention relates to improvements in heating apparatus, and especially those consuming gas, petroleum, and the like. The invention consists in disposing in the interior of the apparatus one or more bodies or masses of refractory or incombustible material through which the heated gases and products of combustion can pass, the said bodies or masses thus constituting heat filters or retainers. The said bodies or masses are or may be placed above and below the burners or grate and at different distances apart, according to the kind of apparatus to which they are applied, and in such a manner that the heat is arrested by them instead of being lost in the chimney, as usually happens with ordinary stoves. The said body or bodies of refractory or incombustible material may be employed or not in conjunction with a non-permeable heat-retainer disposed between said permeable heat retainer or retainers and the chimney or outlet for the gases of combustion.

The invention may be carried into effect in various ways, and in order that it may be thoroughly understood I will describe one form thereof as applied to a gas-stove, reference being made to the accompanying drawings, in which—

Figure 1:
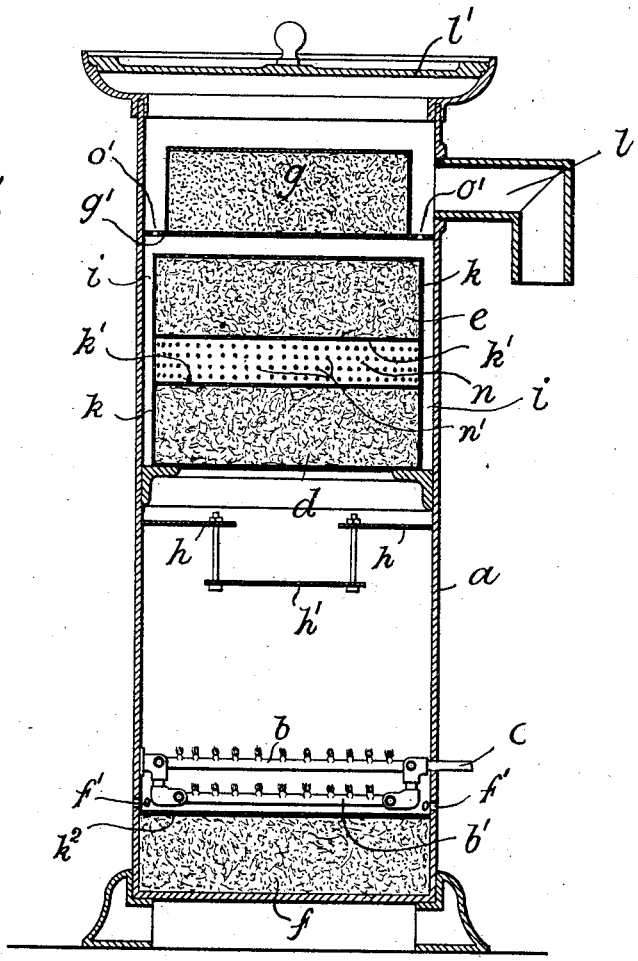
Figure 2:
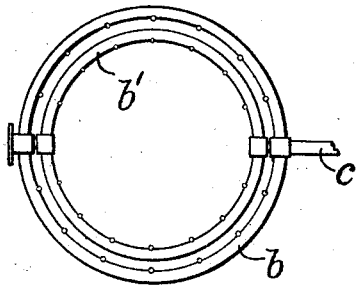

Figure 1 is a vertical mid-section of a gas-stove embodying the invention, and Fig. 2 a separate plan view of the burner-rings thereof.

$a$ is the body of the stove, and $b\ b'$ a double burner-ring to which the gas is supplied by the pipe $c$. Within the body $a$ are provided heat-retainers $d\ e\ f\ g$, each comprising a pulverulent or filamentous refractory or incombustible material, such as kieselguhr, calcined or not, ground or flaked mica, asbestos, talc, graphite, French chalk, or the like, employed alone or two or more in admixture. The heat-retainers $d$, $e$, and $g$ are situated above the burners, while the retainer $f$ is arranged below the burners. $d$, $e$, and $f$ are permeable to the hot gases of combustion, while $g$ is not permeable, but acts as a heat-retainer.

I prefer to employ kieselguhr as the refractory material for the retainers $d$ and $f$, mica for the retainer $e$, and talc for the non-permeable retainer $g$.

The refractory material of $d$ and $e$ is inclosed in the upper and lower chambers of a metallic drum or casing $k$, supported in the stove, for example, as shown, while the material of $f$ is covered and kept in place by a perforated plate $k^2$. The casing $k$ is divided by transverse perforated plates or foraminous diaphragms $k'\ k'$ into the three chambers, the upper and lower of which serve for the reception of the refractory material of $d$ and $e$, an intermediate chamber $n$ of suitable dimensions being comprised between the plates $k'\ k'$. A suitable number of rows of holes or perforations $n'$ are provided around the side wall of the chamber $n$ to permit the escape of any excess of heat and products of combustion from this chamber. The casing $k$ does not quite extend to the side of the stove, a small annular space $i$ being thus left between said casing and the side of the stove. The lower heat-retainer $f$ is in contact with the side wall of the stove.

In the body of the stove immediately above the heat-retainer $f$ and under the burners perforations or holes $f'$ are provided for the supply of air to support combustion.

At a suitable distance below the heat-retainer $d$ are two opposite baffles $h\ h$, the space between said baffles being preferably equal to one-third the diameter of the stove. Below the baffles $h\ h$ a third baffle $h'$ is arranged centrally of the stove, this baffle $h'$ being suspended by four or other convenient number of rods or the like from the baffles $h\ h$ or otherwise suitably supported below the space between the same. The hot gases are thus compelled to take a sinuous course around the baffles on their way to the top of the stove. The heat-retainer $g$ is mounted above the heat-retainer $e$ and at about the level of the chimney $l$. Its top preferably extends slightly above the outlet-opening to the chimney. It consists of a closed casing filled with pulverulent or filamentous incombustible material, preferably talc. The bottom of the casing $g$ extends as an external brim $g'$—say about two centimeters wide—to the side of the stove, this brim being formed with a ring of perforations $o'$ extending around same for the passage of any excess of gases and products of combustion. These holes may, for example, be three-quarters of a centimeter in diameter and spaced about one centimeter apart. The top and bottom of the casing $h$ may be formed or provided with similar perforated brims, if desired. The stove is provided with a double burner-ring $b\ b'$, the lower ring being disposed below and of less diameter than the upper one, as seen in Fig. 2. I find that by employing such an arrangement of burners the gas-jets of the lower ring heat the upper ring, thus warming the gas before it is consumed and considerably increasing the heat produced.

The products of combustion pass to the outlet-pipe $l$, which opens into the body of the stove above the heat retainers or filters $d\ e$.

The outlet-pipe is preferably formed with a downward bend, as shown. By this means the gas-flames are prevented from being blown out, even when turned down very low, by downdraft. This downward bend also allows the gases and products of combustion to escape quickly and insures quiet burning of the flames. Should, however, for any reason the flame be extinguished or the gas accidentally turned on, the gas cannot escape into the room, but will pass away by the chimney, this being proved by many practical trials conducted by me with my improved apparatus.

The stove is closed at the top by any suitable cover—as, for example a flanged cover $l'$.

When the stove is alight, the products of combustion pass up through the filters or retainers $d\ e$, which retard their exit and extract the greater part of their heat. Thence they pass through the ring of openings $o'$ in the brim $g'$ of the heat-retainer $g$ to the outlet-pipe $l$, the retainer $g$ retaining further heat which has not been arrested by $d$ and $e$. The small ring-shaped space $i$ allows the passage of any excess of heated gases or products of combustion which may arise by reason of irregularity of the gas-pressure. The said space might be replaced, if desired, by suitable valves provided in the filters $d\ e$. Steam produced in the upper portion of the stove by the combustion is collected in the chamber $n$ between the filters or retainers $d\ e$ when the stove is out, and the condensed vapor collected in the chamber can settle on and be absorbed by the filter or retainer $d$, the heat being retained by the heat-retainers $d$, $e$, and $g$. When the stove is out, the condensed steam which forms on or runs down the inside of the stove in the lower portion thereof is collected by the bottom filter or retainer $f$. The heat being thus arrested above the burners by the heat-retainers $d\ e\ g$ and below them by the filter $f$ is distributed in the heating-chamber $a'$ of the stove, with the walls of which the retainer $f$ is directly in contact.

It will be understood that the stove illustrated in the drawings may be arranged to burn solid or liquid fuel instead of gas by substituting a grate or suitable lamps or devices for the gas-burners.

A gas-stove made as described above and being about 0.82 meter high and about 0.36 meter in diameter will in about five minutes warm a room of one hundred cubic meters to a temperature of 18° to 20° centigrade, and the heat retainers or reservoirs will still supply heat for a considerable time after the stove has been extinguished.

The heat-filters $d\ e\ f$ constitute, as it were, sponges, which absorb the water, steam, and odors when the stove is alight, and these escape through the chimney when the stove is out.

I find that very efficient, light, incombustible, and refractory materials for making the heat filters or retainers are flaked mica and kieselguhr finely ground and passed through a sieve having about two hundred and sixty meshes per square centimeter. As filtering materials both these possess more or less the same properties; but mica does not absorb moisture, while kieselguhr can absorb fifty per cent. of its own weight of moisture. The specific weight of kieselguhr is 0.1 kilo to the liter, so that should the filters $d$ and $f$ contain one kilo of material they would absorb each one-fourth liter of moisture, and this is the reason why these filters are filled with a material permeable to the gases, heat, and moisture.

Supposing that such a stove consumes ten cubic meters of gas per day, this gas will evolve one-fourth liter of moisture in the filter $d$ and one-fourth liter of moisture in the filter $f$. These figures will not always be correct, seeing that the stove will not always burn in the same way. After a certain time the moisture and the moist gases will escape by the chimney. It will be seen that the whole arrangement is such that not the slightest quantity of gas can remain between the joints of the stove, but only in the permeable filters or retainers, from whence it escapes again to the chimney. It is well known that illuminating-gas only evolves about four to five per cent. of moisture per cubic meter and that kieselguhr can absorb thirty-two cubic meters of moisture per day. Therefore it will be obvious that all the moisture contained in the gas will be absorbed by the filters.

Supposing the stove should burn only eight cubic meters of gas per day, the filters would absorb the moisture of the gas evolved during four days and would have plenty of time during these four days to again evolve the absorbed moisture.

Kieselguhr and flaked mica have also the property of not agglomerating, so that they will serve a very long time; but should they do so at any time they can be cleaned by simply washing and drying them. In such a case it might, however, be better to renew the materials, as their cost is very small.

I wish it to be understood that the construction of stove described and illustrated is merely given as an example of how my invention may be carried into effect. Any number of filters or retainers may be applied to any kind of heating apparatus for domestic or other use and where any kind or nature of fuel is employed, whether gas, coal, alcohol, petroleum, or the like. I do not confine myself to the use of flaked mica and kieselguhr as the filtering material, as any substances having similar properties may be used in their stead or in combination with them.

What I claim as my invention, and desire to secure by Letters Patent, is—

1. In a heating apparatus, a body of finely-divided incombustible material being a bad conductor of heat and permeable to the gases of combustion, disposed in the interior of the apparatus in the path of the hot gases of combustion, in combination with a non-permeable heat-retainer disposed between said permeable heat-arrester and the outlet for the gases of combustion, substantially as and for the purposes specified.

2. In a heating apparatus a permeable body of kieselguhr located below the point of combustion, a second permeable body of kieselguhr located above said point, a permeable body of mica disposed above said second body of kieselguhr and a body of talc inclosed in a non-permeable casing disposed above said body of mica, substantially as and for the purposes specified.

3. In a heating apparatus, a casing divided by pervious diaphragms into upper, lower and intermediate chambers, said upper and lower chambers being filled with an incombustible material being a bad conductor of heat and permeable to the gases of combustion, the side walls of said intermediate chamber being perforated and the material in said upper and lower chambers retained in place by pervious plates or ends, said casing being disposed in the interior of the apparatus in the path of the gases of combustion in such manner as to leave a space between the exterior of said casing and the inner wall of the apparatus, substantially as and for the purposes specified.

4. In a heating apparatus, a casing divided by pervious diaphragms into upper, lower and intermediate chambers, said upper and lower chambers being filled with incombustible material being a bad conductor of heat and permeable to the hot gases of combustion, the side walls of said intermediate chamber being perforated and the material in said upper and lower chambers retained in place by pervious plates or ends, said casing being disposed above the source of heat in the path of said gases in such manner as to leave a space between the exterior of the casing and the inner wall of the apparatus, in combination with a body of permeable incombustible material disposed below the point of combustion and covered at top with a permeable cover, substantially as and for the purposes specified.

5. In a heating apparatus, a casing divided by pervious diaphragms into upper, lower and intermediate chambers, said upper and lower chambers being filled with incombustible material being a bad conductor of heat and permeable to the hot gases of combustion, the side walls of said intermediate chamber being perforated and the material in said upper and lower chambers retained in place by pervious plates or ends, said casing being disposed above the source of heat in the path of said gases in such manner as to leave a space between the exterior of said casing and the inner wall of the apparatus, in combination with a body of permeable incombustible badly-conducting material disposed below the point of combustion and covered at top with a pervious cover, and a non-pervious casing filled with incombustible badly-conducting material disposed above the first-mentioned casing between same and the outlet for the gases of combustion, said non-pervious casing being connected by a perforated rim extending around it to the internal wall of the apparatus, substantially as and for the purpose specified.

6. In a heating apparatus, a casing divided by pervious diaphragms into upper, lower and intermediate chambers, said upper and lower chambers being filled with incombustible material being a bad conductor of heat and permeable to the hot gases of combustion, the side walls of said intermediate chamber being perforated and the material in said upper and lower chambers retained in place by pervious plates or ends, said casing being disposed above the source of heat in the path of said gases in such manner as to leave a space between the exterior of said casing and the inner wall of the apparatus in combination with a body of permeable incombustible material disposed below the point of combustion and covered at top with a pervious cover, and a non-pervious casing filled with incombustible badly-conducting material disposed above the first-mentioned casing between same and the outlet for the gases of combustion, said non-pervious casing being connected by a perforated rim extending around it to the internal wall of the apparatus, and baffles disposed between the point of combustion and said perforated casing, substantially as and for the purposes specified.

7. In a gas heating-stove, filters for the gases, disposed above and below the burners and containing calcined kieselguhr, and an uppermost filtering layer of very light flake mica.

In witness whereof I have hereunto signed my name in the presence of two subscribing witnesses.

JEAN JOSEPH HUBERT SOUHEUR.

Witnesses:
GUILLAUME MARIE ALPHONSE HUBERT VANDEURNS,
AUGUSTE FRANÇOIS PHILAGÈNE LEPEINKEUR.